(12) United States Patent
Hugo

(10) Patent No.: US 6,194,484 B1
(45) Date of Patent: Feb. 27, 2001

(54) COATING MATERIAL

(76) Inventor: Gerd Hugo, An der Point 7, D-86938 Schondorf (DE)

( * ) Notice: Subject to any disclaimer, the term of this patent is extended or adjusted under 35 U.S.C. 154(b) by 0 days.

(21) Appl. No.: 09/325,969

(22) Filed: Jun. 4, 1999

Related U.S. Application Data

(63) Continuation of application No. PCT/DE97/02831, filed on Dec. 3, 1997.

(30) Foreign Application Priority Data

Dec. 4, 1996 (DE) .................................. 196 50 300

(51) Int. Cl.$^7$ ................ C08K 3/08; C08K 3/04; C08K 3/10; C08K 3/30; C08K 9/02
(52) U.S. Cl. ............ 523/135; 523/205; 524/401; 524/403; 524/406; 524/408; 524/413; 524/418; 524/439; 524/440; 524/441; 524/496
(58) Field of Search ................ 523/135, 205; 524/401, 418, 439, 496, 440, 441, 403, 406, 408, 413

(56) References Cited

U.S. PATENT DOCUMENTS 4,916,014 * 4/1990 Weber et al. .
5,026,429 * 6/1991 Mronga et al. .
5,540,998 * 7/1996 Yamada et al. .

FOREIGN PATENT DOCUMENTS 058210 8/1982 (EP) .
548822 6/1993 (EP) .
6-128392 * 5/1994 (JP) .

* cited by examiner

*Primary Examiner*—Tae Yoon
(74) *Attorney, Agent, or Firm*—Fitch, Even, Tabin & Flannery

(57) ABSTRACT

The invention relates to a coating material comprising a binding agent with high transparency in the thermal infrared range; first, plate-shaped particles, which reflect in the wavelength range of thermal infrared, and/or first spherical particles which backscatter in the wavelength range of thermal infrared; and/or second spherical particles which, in the dry state, have and/or form a hollow space, and consist of a material which is transparent in the thermal infrared range; second particles which reflect and/or backscatter in the wavelength range of visible light from 0.35–0.7 μm, and are transparent in the wavelength range of thermal infrared, and/or polymer pigments which are transparent in the thermal infrared range and which, in the dry state, have and/or form a hollow space,; third spherical particles which are electrically conductive and hare a low absorption in the thermal infrared range; other admixtures known per se, that are usually used for coating.

54 Claims, No Drawings

COATING MATERIAL

This is a continuation, of prior application number PCT/DE97/02831, filed Dec. 3, 1997 designating the U.S., which is hereby incorporated herein by reference in its entirety. The entire disclosure of the prior application, from which a copy of the oath or declaration is supplied under paragraph 3 below, is considered as being part of the disclosure of the accompanying application, and is hereby incorporated by reference therein.

It would be desirable to save energy in houses and buildings if the coating materials in the exterior and/or interior could absorb solar energy without emitting this again directly in the long-wave range of the thermal infrared.

Normally, white coating materials employed as wall paints have the following spectral properties:

The reflection in the wavelength range of visible light from 0.35 to 0.7 is over 80%. The absorption in the wavelength range of the near infrared from 0.7 to 2.5 $\mu$m increases by 10% at 0.7 $\mu$m to approximately 50% at 2.5 $\mu$m. The emission in the wavelength range of the thermal infrared from 8 to 14 $\mu$m typically lies on the average at 90%.

However, since solar irradiation has its maximal energy at approximately 1 $\mu$m, it would be desirable to achieve an absorption which is as high as possible with coating material starting from 0.7 $\mu$m, i.e. directly adjacent to the visible range. In this, the sun provides 7-fold more energy in the short-wave half of the near infrared as in the long-wave half. Furthermore, it is desirable to not re-emit absorbed energy in the long-wave range of the thermal infrared at 8 to 14 $\mu$m.

In DE-A 195 01 114, coating materials are disclosed which only partially re-emit absorbed solar energy in the long-wave range of thermal radiation. However, the particles introduced here for absorption of the solar energy lead to a more or less strong darkening of the coating material in the visible range.

Dark, absorbing coating materials which can take up the largest part of solar energy do not correspond to the aesthetic needs of house inhabitants. White or at least near white, very light coating materials are desired.

DE-A 195 01 114 discloses a coating material of this type which can have a relatively light appearance but has a very low degree of effectiveness with respect to solar absorption.

Furthermore, it is desirable that house walls in temperate to cold climatic zones have an angle-dependent degree of emission which permits less energy from being radiated off into the cold sky but receive the thermal radiation of the predominantly warm ground. In contrast, in hot climatic zones it is desirable to select a degree of emission directed to the sky which is as large as possible because heat can be led off into the predominantly clear sky in desert regions, whereas the thermal irradiation of the hot surroundings is reflected.

In DE-A 195 01 114 an angle-dependent degree of emission is not provided for a coating.

The object of the invention is to provide a white, preferably light, coating material having a high absorption capacity for solar radiation and having a low emission capacity in the range of the thermal infrared from 5 to 100 $\mu$m, but at least from 8 to 14 $\mu$m. A light tinting means that the reflection of the visible light in the wavelength range 0.35 to 0.7 $\mu$m takes on values of 50% and more.

With the coating material proposed according to the invention, it is possible to absorb 30 to 50% of the solar energy with a coating material which is preferably light for aesthetic reasons. This is clearly more than is possible with customary light coating materials. Additionally, the energy obtained in this manner is only re-emitted to approximately 50% in the wavelength range of the thermal infrared. The energy gain can be led into the house wall. With customary coating materials, the degree of emission in the wavelength range of the thermal infrared lies at 90 to 95%. Here, only small energy gains are possible because the absorbed solar energy is re-emitted at 90 to 95%.

The object is solved according to the invention by a coating material which comprises, a) a binding agent with large transparency of at least 30%, preferably >50%, in the range of visible light from 0.35 to 0.7 $\mu$m and with at least 20%, preferably >40%, in the range of the thermal infrared from 5 to 100 $\mu$m, at least from 5 to 15 $\mu$m, b) first, plate-shaped particles which reflect in the wavelength range of the thermal infrared from 5 to 100 $\mu$m, but at least from 5 to 25 $\mu$m, and whose dimensions are L×B×T, L=5–100 $\mu$m, B=5–100 $\mu$m and T=0.1–5 $\mu$m, preferably L=30–60 $\mu$m, B=30–60 $\mu$m and T=0.5–1,5 $\mu$m, whereby L=length, B=breadth, and T=thickness.

and/or first, spherical particles which backscatter (Mie backscattering) in the wavelength range of thermal infrared from 5 to 100 $\mu$m, but at least from 5 to 25 $\mu$m, and have a degree of transmission in this wavelength range of at least 20% and are present as monocrystals, wherein the average diameter of the first, spherical particles d is determined by the formula $$d=10\ \mu\text{m}/2.1\cdot(n_{T10}-n_{B10}),$$

wherein
$n_{T10}$=refractive index of the first, spherical particle at the wavelength 10 $\mu$m and
$n_{B10}$=refractive index of the binding agent at the wavelength 10 $\mu$m and/or second, spherical particles which have and/or form a hollow space in the dry state that are comprised of a material that has a degree of transmission in the range of the thermal infrared from 5 to 100 $\mu$m, but at least from 5 to 25 $\mu$m, of >20%, preferably >30%, and backscatter and/or reflect in the wavelength range of the thermal infrared from 5 to 100 $\mu$m, but at least from 5 to 25 $\mu$m, and whose average diameter is 2 to 20 $\mu$m c) second particles which reflect and/or backscatter in the wavelength range of visible light from 0.35 to 0.7 $\mu$m and have a degree of transmission in the wavelength range of the thermal infrared from 5 to 100 $\mu$m, but at least from 5 to 25 $\mu$m, of >20%, preferably >40%, and which are present at monocrystals, wherein the average diameter of the second particle d is determined by the formula $$d=0.55\ \mu\text{m}/2.1\cdot(n_{T0.55}-n_{B0.55}),$$

wherein
$n_{T0.55}$=refractive index of the second particle at the wavelength 0.55 $\mu$m and
$n_{B0.55}$=refractive index of the binding agent at the wavelength 0.55 $\mu$m and/or polymer pigments which have a degree of transmission in the thermal infrared range of 5 to 100 $\mu$m, but at least from 8 to 14 $\mu$m, of >20%, preferably >30%, and which have and/or form a hollow space in the dry state, wherein the average diameter of the polymer pigment particles is 0.2 to 2 $\mu$m, preferably 0.3 to 1 $\mu$m d) third, spherical particles which are electrically conducting and have a low absorption in the range of the thermal infrared from 5 to 25 μm of <80%, preferably <60%, and whose average diameter is 0.1 to 2 μm, preferably 0.2 to 1 μm e) other known additives which are typically used in coatings, namely solvents such as water, aromatic solvents such as solvent naphtha, xylene, toluene, polar solvents such as alcohols and thickening agents, thixotroping agents, anti-foaming agents, dispersing agents for the given particles, additives for reducing the film-forming temperature such as glycols and benzene.

Average diameter or average particle size is to be understood in that the diameter for the particle size take on values in the respectively named ranges and are present in a normal distribution around this value.

Advantageous embodiments of the subject matter of the invention are provided for in the dependent claims.

An advantageous embodiment of the subject matter of the invention is characterized in that the binding agent is selected from a) the group of aqueous dispersions and emulsions which comprise dispersions and emulsions based on acrylate, styrene acrylate, polyethylene, polyethylene oxidate, ethylene-acrylic acid copolymers, methacrylate, vinylpyrrolidone-vinyl acetate copolymers, polyvinylpyrrolidone, polyisopropyl acrylate, polyurethane and/or b) from the group of solvent-containing binding agents which comprise acryl, cyclized rubber, butyl rubber, hydrocarbon resin, α-methylstyrene-acrylonitrile copolymers, polyester imide, acryl acid butyl esters, polyacrylic acid esters, polyurethanes, aliphatic polyurethanes, chlorosulfonated polyethylene and/or c) from the group of thermoplastic materials such as polyolefins and polyvinyl compounds, especially polyethylene, polypropylene, teflon and polyamide.

An advantage embodiment of the subject matter of the invention is characterized in that the first, plate-shaped particles consist of at least one material which is selected from a) metal and/or metal alloys selected from aluminum, aluminium-bronze, antimony, chromium, iron, gold, iridium, copper, magnesium, molybdenum, nickel, palladium, platinum, silver, tantalum, bismuth, tungsten, zinc, tin, bronze, brass, nickel brass, nickel/chromium alloy, nickeline, constantan, manganin and steel, b) and/or from electrically non-conducting materials which are coated or covered with metal or metal alloys selected from aluminium, aluminium-bronze, antimony, chromium, iron, gold, iridium, copper, magnesium, molybdenum, nickel, palladium, platinum, silver, tantalum, bismuth, tungsten, zinc, tin, bronze, brass, nickel brass, nickel/chromium alloy, nickeline, constantan, manganin, steel or electrically conducting tin oxide c) and/or the first, plate-shaped particles are formed as laminated pigments which are constructed of at least three layers, wherein the middle layer has a smaller refractive index than the outer layers and whose materials are selected from the group of materials which have a transmission >20%, preferably >40%, in the wavelength range of the thermal infrared from 5 to 25 μm that comprise (1) inorganic materials such as metallic sulfides selected from zinc sulfide and lead sulfide, metallic selenides such as zinc selenide, fluorides selected from calcium fluoride, lithium fluoride, barium fluoride and sodium fluoride, antimonides such as indium antimonide, metallic oxides selected from zinc oxide, magnesium oxide, antimony oxide, from barium titanate, barium ferrite, calcium sulfate, barium sulfate and from mixed crystals of the named materials and electrically conducting tin oxide (2) and/or organic materials selected from acrylate, styrene acrylate, polyethylene, polyethylene oxidate, chlorosulfonated polyethylene, ethylene-acrylic acid copolymers, methacrylate, vinylpyrrolidone-vinyl acetate copolymers, polyvinylpyrrolidone, polyisopropyl acrylate, polyurethanes, cyclized rubber, butyl rubber, hydrocarbon resin, α-methylstyrene-acrylonitrile copolymers, polyester imide, acryl acid butyl esters, polyacrylic acid esters whose refractive index can be selectively increased by addition of colloidal metal particles.

A further advantageous embodiment of the subject matter of the invention is characterized in that the first, spherical particles consist of at least one material that is selected from metallic sulfides such as zinc sulfide and lead sulfide, from metallic selenides such as zinc selenide, from fluorides such as calcium fluoride, lithium fluoride, barium fluoride and sodium fluoride, from carbonates such as calcium carbonate or magnesium carbonate, from antimonides such as indium antimonide, from metallic oxides such as zinc oxide, magnesium oxide, antimony oxide, from barium titanate, barium ferrite, calcium sulfate, barium sulfate and from mixed crystals of the named materials selected from mixed crystals of barium sulfate with zinc sulfide such as the lithopones of Sachtleben Chemie.

A further advantageous embodiment of the subject matter of the invention is characterized in that the material of the second, spherical particles consist of at least one material that is selected from acrylate, styrene acrylate, acrylonitrile copolymer, polyethylene, polyethylene oxidate, chlorosulfonated polyethylene, ethylene-acrylic acid copolymer, methacrylate, vinylpyrrolidone-vinyl acetate copolymer, vinylidene chloride copolymer, polyvinylpyrrolidone, polyisopropyl acrylate, polyurethane, from cyclized rubber, butyl rubber, hydrocarbon resin, α-methylstyrene-acrylonitrile copolymer, polyester imide, acryl acid butyl esters, polyacrylic acid esters.

A further advantageous embodiment of the subject matter of the invention is characterized in that the second particles consist of at least one material that is selected from metallic sulfides such as zinc sulfide and lead sulfide, from metallic selenides such as zinc selenide, from fluorides selected from calcium fluoride, lithium fluoride, barium fluoride and sodium fluoride, from carbonates such as calcium carbonate or magnesium carbonate, from antimonides such as indium antimonide, from metallic oxides such as zinc oxide, magnesium oxide, antimony oxide, from barium titanate, barium ferrite, calcium sulfate, barium sulfate and from mixed crystals of the named materials such as mixed crystals of barium sulfate with zinc sulfide such as the lithopones of Sachtleben Chemie.

A further advantageous embodiment of the subject matter of the invention is characterized in that the material of the second particles, which are present as polymer pigment, consist of at least one material that is selected from acrylate, styrene acrylate, acrylonitrile copolymer, polyethylene, polyethylene oxidate, chlorosulfonated polyethylene, ethylene-acrylic acid copolymer, methacrylate, vinylpyrrolidone-vinyl acetate copolymer, vinylidene chloride copolymer, polyvinylpyrrolidone, polyisopropyl acrylate, polyurethane, from cyclized rubber, butyl rubber, hydrocarbon resin, α-methylstyrene-acrylonitrile copolymer, polyester imide, acryl acid butyl esters, polyacrylic acid esters.

A further advantageous embodiment of the subject matter of the invention is characterized in that the third, spherical particles are electrically conducting particles which are light or transparent in the visible range consisting of at least one material that is selected from a) the group of metals such as aluminium, antimony, chromium, iron, gold, iridium, copper, magnesium, molybdenum, nickel, palladium, platinum, silver, tantalum, bismuth, tungsten, zinc and tin b) and/or from the group of metal alloys such as bronze, brass, nickel brass, nickel/chrome, nickeline, constantan, manganin, and steel c) and/or from the group of electrically conducting polymers such as polypyrrole or polyaniline whose diameter lies at 0.1 to 1.2-fold the average wavelength of 0.55 μm of visible light, and is preferably smaller than the average wavelength of visible light.

d) and/or from the group of electrically conducting coated pigments such as from the group of the silicates such as talcum, kaolin, mica feldspar, wollastonite, silicon dioxide or from the group of metallic oxides such as titanium dioxide or from barium sulfate, which are coated with antimony-doped or with fluorine-doped tin oxide e) and/or from the group of pigments which are produced by doping with known doping agents such as alkali-, ammonium- or alkali earth fluorides as well as tin(II) fluoride, hydrogen fluoride and antimony(III) oxide as well as electrically conducting tin oxide f) and/or from the group of conductive carbon blacks whose diameter lies at 0.1 to 1.2-fold the average wavelength of visible light of 0.55 μm and is preferably smaller than the average wavelength of visible light g) and/or from the group of mineral materials with natural, electric conductivity such as zinc blende.

A further advantageous embodiment of the subject matter of the invention is characterized in that at least one further filler is added which is transparent in the wavelength range of visible light and has a low refractive index below 2.5, preferably below 2.0, in the wavelength range of thermal infrared from 5 to 100 μm, but at least in the wavelength range of 5 to 25 μm and has a low absorption <80%, preferably <60%, in this wavelength range and whose average particles size is 0.3 to 30 μm, preferably 0.5 to 20 μm.

A further advantageous embodiment of the subject matter of the invention is characterized in that the at least one further filler is selected from the group of inorganic fillers such as calcium carbonate, calcium sulfate, calcium fluoride, magnesium carbonate and/or from the group of organic fillers such as acrylate, acrylonitrile copolymers, vinylidene chloride copolymers, styrene acrylate, polyethylene, polyethylene oxidate, chlorosulfonated polyethylenes, ethylene-acryl acid copolymers, methacrylate, vinylpyrrolidone-vinyl acetate copolymers, polyvinylpyrrolidone, polyisopropyl acrylate, polyurethanes or from cyclized rubber, butyl rubber, hydrocarbon resin, α-methylstyrene-acrylonitrile copolymers, polyester imide, acrylic acid butyl esters, polyacrylic acid esters.

A further advantageous embodiment of the subject matter of the invention is characterized in that the at least one further filler is present in the form of micro-hollow spheres and has an average diameter of 20 to 250 μm, preferably of 40 to 120 μm.

A further advantageous embodiment of the subject matter of the invention is characterized in that at least one type of paint pigment is used for tinting in the visible range which has a high transmission >40%, preferably >60%, in the wavelength range of the thermal infrared of 5 to 25 μm and has a high absorption of >30%, preferably >50%, in the entire solar spectrum from 0.4 to 2.5 μm, which is selected from the group of inorganic paint pigments, especially the metallic oxides such as iron oxides, chromium oxides but also tris(hexacyanoferrates (II)) of the formula $Fe_4[Fe(CN)_6]_3$ such as mannox iron-blue from Degussa and from the group of organic paint pigments such as Paliogen (trademark) Black S0084 of BASF from the group of the perylenes.

A further advantageous embodiment of the subject matter of the invention is characterized in that the first, plate-shaped particles are of the type that they are alignable by an electric field or a magnetic field and cause an angle-dependent degree of emission of the entire arrangement.

A further advantageous embodiment of the subject matter of the invention is characterized in that the surface reactable metals and materials are protected by fatty acids, chromizing or phosphatizing.

A further advantageous embodiment of the subject matter of the invention is characterized in that the first, plate-shaped particles of electrically non-conducting material are plastic or mineral mica.

A further advantageous embodiment of the subject matter of the invention is characterized in that a coating material with one of the previous features is used, wherein the coating material must contain the first, plate-shaped particles and that an electric field and/or magnetic field is switched on during and/or after the application of the coating material to a carrier.

The subject matter of the invention is more closely described in the following by means of Examples.

EXAMPLE 1

280 g water
4 g thickening agent Tylose MH 2000 BASF
300 g polymer pigment emulsion Ropague OP-62 Rohm and Haas
180 g styrene-acrylate dispersion Mowilith DM 611 Hoechst
120 g polyethylene oxidate Poligen WE1 BASF
3 g anti-foaming agent Byk 023
3 g pigment disperser N BASF
70 g electrically conducting pigment Sacon P401 Sachtleben
650 g Sachtolith L Sachtleben
40 g water
70 g aluminium flakes Reflexal 100 Eckart
5 g Dowanol TPM Dow Chemicals After dispersion in a mixer, the materials were spread on a commercial color testing card with which color fastness and opacity can also be tested and spectrally measured after drying.
The Results were as Follows:
The reflection in the range of visible light from 0.35 to 0.7 was 78%. The absorption in the near infrared range from 0.7 to 2.5 μm was on average 40%. The emission in the range of the thermal radiation from 8 to 14 μm was on average 54%. The wide-band measurement of the coating with a thermobattery of 6 to >100 μm resulted in a degree of emission of 51%. The visual optic impression was white. Despite the high degree of white, the solar absorption in the near infrared range was very good. Only 51% of the solar energy thus gained was lost by emission.

EXAMPLE 2

280 g water
4 g thickening agent Tylose MH 2000 BASF
300 g polymer pigment emulsion Ropague OP-62 Rohm and Haas
180 g styrene-acrylate dispersion Mowilith DM 611 Hoechst
80 g acrylate dispersion Mowilith DM 771 Hoechst
40 g wax emulsion Ultralube W-842 N Keim-Additec
3 g anti-foaming agent Byk 023
3 g pigment disperser N BASF
50 g stabilized brass-pigment, ultrafine, particle size 1 μm Eckart
300 g Sachtolith L Sachtleben
40 g water
350 g resin sealer GR Heubach
110 g stainless steel flakes SS Fine Water Grade Novamet USA
5 g Dowanol TPM Dow Chemicals After dispersion in a mixer, the materials were spread on a commercial color testing card with which color fastness and opacity can also be tested and spectrally measured after drying.
The Results were as Follows:
The reflection in the range of visible light from 0.35 to 0.7 was 75%. The absorption in the near infrared range from 0.7 to 2.5 μm was on average 46%. The emission in the range of the thermal radiation from 8 to 14 μm was on average 52%. The wide-band measurement of the coating with a thermobattery of 6 to >100 μm resulted in a degree of emission of 49%.

EXAMPLE 3

320 g water
6 g thickening agent Tylose MH 2000 BASF
200 g polymer pigment emulsion Ropague OP-62 Rohm and Haas
160 g styrene-acrylate dispersion Acronal 290D BASF
120 g acrylate dispersion Mowilith DM 771 Hoechst
3 g anti-foaming agent Byk 023
3 g pigment disperser N BASF
60 g stabilized silver pigment, micronized, particle size <1 μm
3 g conductive carbon black, micronized, particle size <0.4 μm
300 g course white pigment of zinc sulfide, particle size 4–5 μm, Sachtleben
50 g Sachtolith L Sachtleben
5 g Dowanol TPM Dow Chemicals After dispersion in a mixer, the materials were spread on a commercial color testing card with which color fastness and opacity can also be tested and spectrally measured after drying.
The Results were as Follows:
The reflection in the range of visible light from 0.35 to 0.7 was 82%. The absorption in the near infrared range from 0.7 to 2.5 μm was on average 38%. The emission in the range of the thermal radiation from 8 to 14 μm was on average 55%. The wide-band measurement of the coating with a thermobattery of 6 to >100 μm resulted in a degree of emission of 59%.

EXAMPLE 4

280 g water
4 g thickening agent Tylose MH 2000 BASF
300 g polymer pigment emulsion Ropague OP-62 Rohm and Haas
120 g styrene-acrylate dispersion Acronal 290D BASF
180 g acrylate dispersion HG-54K Rohm and Haas
3 g anti-foaming agent Byk 023
3 g pigment disperser N BASF
90 g zinc blende, micronized, d50 = 1.5 μm Metallgesellschaft
500 g Sachtolith L
40 g water
200 g resin sealer GR Heubach
150 g stainless steel flakes SS Fine Water Grade Novamet USA
5 g Dowanol TPM Dow Chemicals After dispersion in a mixer, the materials were spread on a commercial color testing card with which color fastness and opacity can also be tested and spectrally measured after drying.
The Results were as Follows:
The reflection in the range of visible light from 0.35 to 0.7 was 73%. The absorption in the near infrared range from 0.7 to 2.5 μm was on average 47%. The emission in the range of the thermal radiation from 8 to 14 μm was on average 55%. The wide-band measurement of the coating with a thermobattery of 6 to >100 μm resulted in a degree of emission of 59%.

EXAMPLE 5

350 g Alpex Hoechst
64 g Novares LA 300 Rütger VFT AG
35 g solvent naphtha 180/210
65 g Sachtolith HD-S Sachtleben
11 g Tego Conduct UF Goldschmidt
50 g zinc flakes Novamet USA After dispersion in a mixer, the materials were spread on a commercial color testing card with which color fastness and opacity can also be tested and spectrally measured after drying.
The Results were as Follows:
The reflection in the range of visible light from 0.35 to 0.7 was 70%. The absorption in the near infrared range from 0.7 to 2.5 μm was on average 43%. The emission in the range of the thermal radiation from 8 to 14 μm was on average 49%. The wide-band measurement of the coating with a thermobattery of 6 to >100 μm resulted in a degree of emission of 47%.

EXAMPLE 6

320 g water
6 g thickening agent Tylose MH 2000 BASF
100 g polymer pigment emulsion Ropaque OP-62 Rohm and Haas
160 g styrene-acrylate dispersion Acronal 290D BASF
120 g acrylate dispersion Mowilith DM 771 Hoechst
3 g anti-foaming agent Byk 023
3 g pigment disperser N BASF
0.5 g conductive carbon black, micronized, particle size <0.4 μm
3 g Paliogen Black S0084 from BASF
300 g course white pigment of zinc sulfide, particle size 5–9 μm, Sachtleben 100 g calcium carbonate, crystalline, Omya
5 g Dowanol TPM Dow Chemicals After dispersion in a mixer, the materials were spread on a commercial color testing card with which color fastness and opacity can also be tested and spectrally measured after drying.
The Results were as Follows:

The reflection in the range of visible light from 0.35 to 0.7 was 70%. The absorption in the near infrared range from 0.7 to 2.5 $\mu$m was on average 42%. The emission in the range of the thermal radiation from 8 to 14 $\mu$m was on average 54%. The wide-band measurement of the coating with a thermobattery of 6 to >100 $\mu$m resulted in a degree of emission of 57%.

EXAMPLE 7

320 g water
6 g thickening agent Tylose MH 2000 BASF
100 g polymer pigment emulsion Ropaque OP-62 Rohm and Haas
160 g styrene-acrylate dispersion Acronal 290D BASF
120 g acrylate dispersion Mowilith DN 771 Hoechst
3 g anti-foaming agent Byk 023
3 g pigment disperser N BASF
1.5 g conductive carbon black, micronized, particle size <0.4 $\mu$m
200 g course white pigment of zinc sulfide, particle size 5–9 $\mu$m, Sachtleben
50 g calcium carbonate, crystalline, Omya
4 g polyethylene micro-hollow spheres, bulk density 0.03–0.9 g/cm$^3$
5 g Dowanol TPM Dow Chemicals After dispersion in a mixer, the materials were spread on a commercial color testing card with which color fastness and opacity can also be tested and spectrally measured after drying.
The Results were as Follows:

The reflection in the range of visible light from 0.35 to 0.7 was 78%. The absorption in the near infrared range from 0.7 to 2.5 $\mu$m was on average 38%. The emission in the range of the thermal radiation from 8 to 14 $\mu$m was on average 52%. The wide-band measurement of the coating with a thermobattery of 6 to >100 $\mu$m resulted in a degree of emission of 57%.

The density of the paint could be reduced by 25% by using micro-hollow spheres.

EXAMPLE 8

320 g water
6 g thickening agent Tylose MH 2000 BASF
100 g polymer pigment emulsion Ropaque OP-62 Rohm and Haas
160 g styrene-acrylate dispersion Acronal 290D BASF
120 g acrylate dispersion Mowilith DM 771 Hoechst
3 g anti-foaming agent Byk 023
3 g pigment disperser N BASF
1 g conductive carbon black, micronized, particle size <0.4 $\mu$m
2 g Mannox iron-blue Degussa
200 g course white pigment of zinc sulfide, particle size 5–9 $\mu$m, Sachtleben
50 g calcium carbonate, crystalline, Omya
2 g Expancel micro-hollow spheres, bulk density 0.03–0.8 g/cm$^3$
5 g Dowanol TPM Dow Chemicals After dispersion in a mixer, the materials were spread on a commercial color testing card with which color fastness and opacity can also be tested and spectrally measured after drying.
The Results were as Follows:

The reflection in the range of visible light from 0.35 to 0.7 was 62%. The absorption in the near infrared range from 0.7 to 2.5 $\mu$m was on average 44%. The emission in the range of the thermal radiation from 8 to 14 $\mu$m was on average 58%. The wide-band measurement of the coating with a thermobattery of 6 to >100 $\mu$m resulted in a degree of emission of 60%.

The density of the paint could be reduced by 25% by using micro-hollow spheres.

EXAMPLE 9

320 g water
6 g thickening agent Tylose MH 2000 BASF
100 g polymer pigment emulsion Ropaque OP-62 Rohm and Haas
160 g styrene-acrylate dispersion Acronal 290D BASF
120 g acrylate dispersion Mowilith DM 771 Hoechst
3 g anti-foaming agent Byk 023
3 g pigment disperser N BASF
1.5 g conductive carbon black, micronized, particle size < 0.4 $\mu$m
1.5 g iron oxide red Bayferrox 720 N Bayer
200 g course white pigment of zinc sulfide, particle size 5–9 $\mu$m, Sachtleben
50 g calcium carbonate, crystalline, Omya
3 g polyethylene micro-hollow spheres, bulk density 0.05–1.3 g/cm$^3$
5 g Dowanol TPM Dow Chemicals After dispersion in a mixer, the materials were spread on a commercial color testing card with which color fastness and opacity can also be tested and spectrally measured after drying.
The Results were as Follows:

The reflection in the range of visible light from 0.35 to 0.7 was 64%. The absorption in the near infrared range from 0.7 to 2.5 $\mu$m was on average 47%. The emission in the range of the thermal radiation from 8 to 14 $\mu$m was on average 55%. The wide-band measurement of the coating with a thermobattery of 6 to >100 $\mu$m resulted in a degree of emission of 58%.

The density of the paint could be reduced by 20% by using polyethylene micro-hollow spheres.

EXAMPLE 10

500 g Desmoderm Finish A Bayer
50 g Desmoderm Additive Z Bayer
10 g electrically conductive pigment Sacon P401 Sachtleben
50 g calcium carbonate, crystalline, Omya
50 g Sachtolith HD-S Sachtleben
150 g stainless steel flakes SS Standard Novamet USA After dispersion in a mixer the materials were knife-coated on a self-adhesive film. In the wet state, the stainless steel flakes in the binding agent were aligned with a large-area electromagnet in such a manner that they took up an angle of 45° to the surface standards. After drying the coating, the self-adhesive film coated in this manner had an angle-dependent degree of emission in the range of the thermal infrared as well as a darker or lighter tinting depending on the direction of observation.

The reflection in the range of visible light from 0.35 to 0.7 was 35% in the angle range of 0° to 45° and 78% from 45° to 180°. The emission in the range of the thermal radiation of 8 to 14 μm was 90% in the angle range of 0° to 45° and 58% from 45° to 180°. The broad-band measurement of the coating with a thermobattery of 6 to >100 μm resulted in a degree of emission of 90% in the angle range of 0° to 45° and degree of emission of 56% from 45° to 180°.

EXAMPLE 11

280 g water
4 g thickening agent Tylose MH 2000 BASF
300 g polymer pigment emulsion Ropaque OP-62 Rohm and Haas
120 g styrene-acrylate dispersion Acronal 290D BASF
180 g acrylate dispersion HG-54K Rohm and Haas
3 g anti-foaming agent Byk 023
3 g pigment disperser N BASF
50 g electrically conducting pigment Sacon P401 Sachtleben
500 g Sachtolith L
40 g water
200 g Harzsiegel GR Heubach
5 g Dowanol TPM Dow Chemicals
100 g Dragon aluminium spangle 20/90, surface treated The materials were mixed without the aluminium spangle and applied with a paint roller to a vertical wall. The Dragon Aluminium Spangle was introduced with an electrostatic flocking apparatus into the wet coating material in such a manner that it took up an angle of 45° oriented downward to the surface standard of the vertical wall. After drying the coating, the wall coated in this manner had an angle-dependent degree of emission in the range of the thermal infrared. The wall coated in this manner had a lower degree of emission to the sky than to the ground.

The emission in the range of the thermal radiation from 8 to 14 μm was 92° in the angle range of 0° to 45° and 56% from 45° to 180°. The wide-band measurement of the coating with a thermobattery of 6 to >100 μm resulted in a degree of emission of 92% in the angle range from 0° to 45° and a degree of mission of 55% from 45° to 180°.

Comparative Example

The following mixture was based on a formulation named in DE-A 195 01 114:

200 g polyethylene-dispersion Poligen PE from BASF
200 g polyethylene-dispersion (oxidate) Poligen WE1 from BASF
40 g acrylate dispersion Mowilith DM 771 Hoechst
2 g anti-foaming agent Byk 023
30 g Collacral VL as thickener
240 g water
400 g lithopone silver sealer from Sachtleben GmbH
80 g aluminium flakes Aquasil BP 2750 from Silberline After dispersion in a mixer, the materials were spread on a commercial color testing card with which color fastness and opacity can also be tested and spectrally measured after drying.

The Results were as Follows:

The reflection in the range of visible light from 0.35 to 0.7 was 67%. The absorption in the near infrared range from 0.7 to 2.5 μm was on average 29%. The emission in the range of the thermal radiation from 8 to 14 μm was on average 71%. The wide-band measurement of the coating with a thermobattery of 6 to >100 μm resulted in a degree of emission of 68%.

The visual optic impression was too grey corresponding to the low reflection in the visible range. The solar absorption in the near infrared range is, with 29%, lower than in the coating material according to the invention and the emission in the range of the thermal radiation is lower than customary coating materials but still too high.

Summary of the Result of Measurement:

| Example | Reflection [%] 0.35–0.7 μm | Absorption [%] 0.7–2.5 μm | Emission [%] 8–14 μm | Emission [%] 6 –> 100 μm |
|---|---|---|---|---|
| Number 1 | 78 | 40 | 54 | 51 |
| Number 2 | 75 | 46 | 52 | 49 |
| Number 3 | 82 | 38 | 55 | 59 |
| Number 4 | 73 | 47 | 55 | 59 |
| Number 5 | 70 | 43 | 49 | 47 |
| Number 6 | 70 | 42 | 54 | 57 |
| Number 7 | 78 | 38 | 52 | 57 |
| Number 8 | 62 | 44 | 58 | 60 |
| Number 9 | 64 | 47 | 55 | 58 |
| DE-A 19501114 | 67 | 29 | 71 | 68 |

What is claimed is:

1. A coating material comprising
   a) a binding agent having a transparency of at least 30% in the range of visible light from 0.35 to 0.7 μm and at least 20% in the range of the thermal infrared from 5 to 100 μm
   b) particles which are selected from at least one of the group consisting of
      first plate-shaped particles which reflect in the wavelength range of the thermal infrared from 5 to 100 μm and whose dimensions are L×B×T, L=5–100 μm, B=5–100 μm and T=0.1–5 μm, whereby L=length, B=breadth, and T=thickness,
      first spherical particles which backscatter (Mie backscattering) in the wavelength range of thermal infrared from 5 to 100 μm and have a degree of transmission in this wavelength range of at least 20% and are present as monocrystals, wherein the average diameter d of said spherical particles is determined by the formula $$d = 10 \mu m/2.1 \cdot (n_{T10} - n_{B10}),$$

wherein
         $n_{T10}$=refractive index of said spherical particle at the wavelength 10 μm and
         $n_{B10}$=refractive index of said binding agent at the wavelength 10 μm, and
      second spherical particles which have a hollow space in the dry state that are comprised of a material that has a degree of transmission in the range of the thermal infrared from 5 to 100 μm of >20% and reflect in the wavelength range of the thermal infrared from 5 to 100 μm and whose average diameter is 2 to 20 μm
   c) particles which are selected from at least one of the group consisting of
      second particles which reflect in the wavelength range of visible light from 0.35 to 0.7 μm and have a degree of transmission in the wavelength range of the thermal infrared from 5 to 100 µm of >20% and which are present as monocrystalst wherein the average diameter d of said second particle is determined by the formula $$d=0.55\mu m/2.1 \cdot (n_{T0.55}-n_{B0.55}),$$

wherein
$n_{T0.55}$=refractive index of said second particle at the wavelength 0.55 µm and
$n_{B0.55}$=refractive index of said binding agent at the wavelength 0.55 µm, and
polymer pigments particles having a degree of transmission in the thermal infrared range of 5 to 100 µm of >20% and having a hollow space in the dry state, wherein the average diameter of said polymer pigment particles is 0.2 to 2 µm
d) third spherical particles which are electrically conducting and have an absorption in the range of the thermal infrared from 5 to 25 µm of <80% and whose average diameter is 0.1 to 2 µm
e) at least one additive conventionally used in coatings.

2. The coating material of claim 1, wherein said binding agent is selected from the group consisting of aqueous dispersions and emulsions, solvent-containing binding agents, and thermoplastic materials.

3. The coating material of claim 2, wherein said aqueous dispersions and emulsions comprise aqueous dispersions and emulsions based on acrylate, styrene acrylate, polyethylene, polyethylene oxide, ethylene-acrylic acid copolymers, methacrylate, vinylpyrrolidone-vinyl acetate copolymers, polyvinylpyrrolidone, polyisopropyl acrylate, or polyurethane.

4. The coating material of claim 2, wherein said solvent-containing binding agent is selected from the croup consisting of acryl, cyclized rubber, butyl rubber, hydrocarbon resin, a-methylstyrene-acrylonitrile copolymers, polyester imide, acryl acid butyl esters, polyacrylic acid esters, polyurethanes, aliphatic polyurethanes and chloro sulphonated polyethylene.

5. The coating material of claim 2, wherein said thermoplastic material is a polymer selected from the group consisting of polyolefins, α-methylstyrene-acrylonitrile copolymers, polyester imide and polyamide.

6. The coating material of claim 1, wherein said first plate-shaped particles are comprised of at least one material selected from the group consisting of
metals, and
metal alloys.

7. The coating material of claim 1, wherein said first plate-shaped particles are formed as laminated pigments which are constructed of at least three layers, wherein the middle layer has a smaller refractive index than the outer layers and whose materials are selected from the materials having a transmission >20% in the wavelength range of the thermal infrared from 5 to 25 µm and comprising at least one selected from the group consisting of
inorganic materials and
organic materials selected from the group consisting of acrylate, styrene acrylate, polyethylene, polyethylene oxidate, chlorosulfonated polyethylene, ethylene-acrylic acid copolymers, methacrylate, vinylpyrrolidone-vinyl acetate copolymers, polyvinylpyrrolidone, polyisopropyl acrylate, polyurethanes, cyclized rubber, butyl rubber, hydrocarbon resin, α-methylstyrene-acrylonitrile copolymers, polyester imide, acryl acid butyl esters, and polyacrylic acid esters.

8. The coating material of claim 7, wherein said inorganic material is at least one selected from the group consisting of zinc sulfide, lead sulfide, metallic selenides, calcium fluoride, lithium fluoride, barium fluoride, sodium fluoride, antimonides, zinc oxide, magnesium oxide, antimony oxide, barium titanate, barium ferrite, calcium sulfate, barium sulfate, mixed crystals thereof, and electrically conducting tin oxide.

9. The coating material of claim 7, wherein the refractive index of said organic material is selectively increased by addition of colloidal metal particles.

10. The coating material of claim 1, wherein the material of said first spherical particles is at least one selected from the group consisting of metallic sulfides, metallic selenides, fluorides, carbonates, antimonides, metallic oxides, barium titanate, barium ferrite, calcium sulfate, barium sulfate, and mixed crystals thereof.

11. The coating material of claim 1, wherein the material of said second spherical particles is at least one selected from the group consisting of
acrylate, styrene acrylate, acrylonitrile copolymer, polyethylene, polyethylene oxidate, chlorosulfonated polyethylene, ethylene-acrylic acid copolymer, methacrylate, vinylpyrrolidone-vinyl acetate copolymer, vinylidene chloride copolymer, polyvinylpyrrolidone, polyisopropyl acrylate, polyurethane, cyclized rubber, butyl rubber, hydrocarbon resin, α-methylstyrene-acrylonitrile copolymer, polyester imide, acryl acid butyl esters, and polyacrylic acid esters.

12. The coating material of claim 1, wherein the material of said second particles is at least one selected from the group consisting of
metallic sulfides, metallic selenides, calcium fluoride, lithium fluoride, barium fluoride, sodium fluoride, carbonates, antimonides, metallic oxides, barium titanate, barium ferrite, calcium sulfate, barium sulfate, and mixed crystals thereof.

13. The coating material of claim 1, wherein the material of said polymer pigment particles is at least one selected from the group consisting of
acrylate, styrene acrylate, acrylonitrile copolymer, polyethylene, polyethylene oxidate, chlorosulfonated polyethylene, ethylene-acrylic acid copolymer, methacrylate, vinylpyrrolidone-vinyl acetate copolymer, vinylidene chloride copolymer, polyvinylpyrrolidone, polyisopropyl acrylate, polyurethane, cyclized rubber, butyl rubber, hydrocarbon resin, α-methylstyrene-acrylonitrile copolymer, polyester imide, acryl acid butyl esters, and polyacrylic acid esters.

14. The coating material of claim 1, wherein the material of said third spherical particles is at least one selected from the group consisting of metals, metal alloys, electrically conducting polymers, electrically conducting coated pigments, pigments produced by doping agents, conductive carbon blacks whose diameter lies at 0.1 to 1.2-fold the average wavelength of visible light of 0.55 µm, and mineral materials with natural electric conductivity.

15. The coating material of claim 14, wherein said metal is selected from the group consisting of aluminium, antimony, chromium, iron, gold, iridium, copper, magnesium, molybdenum, nickel, palladium, platinum, silver, tantalum, bismuth, tungsten, zinc, and tin.

16. The coating material of claim 14, wherein said metal alloy is selected from the group consisting of bronze, brass, nickel brass, nickel/chrome, nickeline, constantan, manganin, and steel.

17. The coating material of claim 14, wherein said electrically conducting polymer is selected from the group consisting of polypyrrole and polyaniline whose diameter lies at 0.1 to 1.2-fold the average wavelength of 0.55 µm of visible light.

18. The coating material of claim 14, wherein said electrically conducting coated pigment is selected from the group consisting of silicates and metallic oxides, which are coated with antimony-doped tin oxide, and silicates and metallic oxides, which are coated with fluorine-doped.

19. The coating material of claim 1, wherein said additive is at least one selected from the group consisting of
solvents, thickening agents, thixotroping agents, antifoaming agents, dispersing agents, and additives for reducing the film-forming temperature.

20. The coating material of claim 19, wherein said solvent is selected from the group consisting of water, aromatic solvents and alcohols.

21. The coating material of claim 1, wherein at least one further filler is added which is transparent in the wavelength range of visible light and has a refractive index below 2.5 in the wavelength range of thermal infrared from 5 to 100 µm and has an absorption <80% in said wavelength range and whose average particles size is 0.3 to 30 µm.

22. The coating material of claim 21, wherein said at least one further filler is present in the form of micro-hollow spheres and has an average diameter of 20 to 250 µm.

23. The coating material of claim 21, where said at least one further filler is selected from the group consisting of inorganic fillers and organic fillers.

24. The coating material of claim 21, wherein said inorganic filler is selected from the group consisting of calcium carbonate, calcium sulfate, calcium fluoride, and magnesium carbonate.

25. The coating material of claim 21, wherein said organic filler is selected from the group consisting of acrylate, acrylonitrile copolymers, vinylidene chloride copolymers, styrene acrylate, polyethylene, polyethylene oxidate, chlorosulfonated polyethylenes, ethylene-acryl acid copolymers, methacrylate, vinylpyrrolidone-vinyl acetate copolymers, polyvinylpyrrolidone, polyisopropyl acrylate, polyurethanes, cyclized rubber, butyl rubber, hydrocarbon resin, α-methylstyrene-acrylonitrile copolymers, polyester imide, acrylic acid butyl esters, and polyacrylic acid esters.

26. The coating material of claim 1, wherein at least one paint pigment is used for tinting in the visible range which has a transmission >40% in the wavelength range of the thermal infrared of 5 to 25 µm and has an absorption of >30% in the entire solar spectrum from 0.4 to 2.5 µm, which is selected from the group consisting of inorganic paint pigments and organic paint pigments.

27. The coating material of claim 1, wherein said first plate-shaped particles are alignable by an electric field or a magnetic field, causing an angle-dependent degree of emission of the entire arrangement.

28. The coating material of claim 1 wherein surface reactive materials are protected by at least one means selected from the group consisting of fatty acids, chromizing and phosphatizing.

29. The coating material of claim 1, wherein said first, plate-shaped particles are plastic or mineral mica.

30. The coating material of claim 1, wherein said binding agent has a transparency of at least 50% in the range of visible light from 0.35 to 0.7 µm.

31. The coating material of claim 1, wherein sa id binding agent has a transparency of at least 40% in the range of the thermal infrared from 5 to 100 µm.

32. The coating material of claim 1, wherein said binding agent has a transparency of at least 20% in the range of the thermal infrared from 5 to 15 µm.

33. The coating material of claim 1, wherein said first plate-shaped particles reflect in the range of the thermal infrared from 5 to 25 µm.

34. The coating material of claim 1, wherein the dimensions of said first plate-shaped particles are L=30–60 µm, B=30–60 µm and T=0.5–1.5 µm.

35. The coating material of claim 1, wherein said first spherical particles backscatter in the range of thermal infrared from 5 to 25 µm.

36. The coating material of claim 1, wherein said material of said second spherical particles has a degree of transmission in the range of the thermal infrared from 5 to 100 µm of >30%.

37. The coating material of claim 1, wherein said material of said second spherical particles has a degree of transmission in the range of the thermal infrared from 5 to 25 µm of >20%.

38. The coating material of claim 1, wherein said material of said second spherical particles reflects in the wavelength range of the thermal infrared from 5 to 25 µm.

39. The coating material of claim 1, wherein said second particles have a degree of transmission in the wavelength range of the thermal infrared from 5 to 100 µm of >40%.

40. The coating material of claim 1, wherein said second particles have a degree of transmission in the wavelength range of the thermal infrared from 5 to 25 µm of >20%.

41. The coating material of claim 1, wherein said polymer pigment particles have a degree of transmission in the thermal infrared range from 5 to 100 µm of >30%.

42. The coating material of claim 1, wherein said polymer pigments particles have a degree of transmission in the thermal infrared range from 8 to 14 µm of >20%.

43. The coating material of claim 1, wherein said polymer pigments particles have an average diameter of 0.3 to 1 µm.

44. The coating material of claim 1, wherein said third spherical particles have an absorption in the range of the thermal infrared from 5 to 25 µm of <60%.

45. The coating material of claim 1, wherein said third spherical particles have an average diameter of 0.2 to 1 µm.

46. The coating material of claim 5, wherein said polyolefin is selected from the group consisting of polyethylene, and polypropylene.

47. The coating material of claim 6, wherein said metal is selected from the group consisting of aluminum, antimony, chromium, iron, gold, iridium, copper, magnesium, molybdenum, nickel, palladium, platinum, silver, tantalum, bismuth, tungsten, zinc and tin.

48. The coating material of claim 6, wherein said metal alloy is selected from the group consisting of aluminum-bronze, bronze, brass, nickel brass, nickel/chromium alloy, nickeling, constantan, manganin and steel.

49. The coating material of claim 6, wherein said first plate-shaped particles are comprised of electrically non-conducting materials are covered with at least one selected from the group consisting of aluminum, aluminum-bronze, antimony, chromium, iron, gold, iridium, copper, magnesium, molybdenum, nickel, palladium, platinum, silver, tantalum, bismuth, tungsten, zinc tin, bronze, brass, nickel brass, nickel/chromium alloy, nickeline, constantan, manganin, steel and electrically conducting tin oxide.

50. The coating material of claim 10, wherein the mixed crystals are mixed crystals of barium sulfate with zinc.

51. The coating material of claim 2, wherein said thermoplastic material is a polyvinyl compound selected from the group consisting of polyvinyl fluoride, polyvinyl chloride, polyvinylpyrrolidone, and vinylpyrrolidone-vinyl acetate copolymers.

52. The coating material of claim 2, wherein said thermoplastic material is an acrylate-containing compound selected from the group consisting of acrylate, styrene acrylate, ethylene-acrylic acid copolymers, methacrylate, polyisopropyl acrylate, esters of polyacrylic acid and acryl acid butyl esters.

53. The coating material of claim 2, wherein said thermoplastic material is a polyurethane.

54. The coating material of claim 2, wherein said thermoplastic material is selected from the group consisting of polyethylene oxidate, chlorosulfonated polyethylene, and polytetrafluoroethane.

* * * * *